(12) United States Patent
Pan

(10) Patent No.: US 8,773,022 B2
(45) Date of Patent: Jul. 8, 2014

(54) METHOD AND DEVICE FOR DYNAMICALLY CONTROLLING HEAT DISSIPATION OF AN ALTERNATING CURRENT LIGHT-EMITTING DIODE DRIVING CIRCUIT

(75) Inventor: Cheng-Hung Pan, Taipei (TW)

(73) Assignee: Luxul Technology Incorporation, Taipei (TW)

( * ) Notice: Subject to any disclaimer, the term of this patent is extended or adjusted under 35 U.S.C. 154(b) by 158 days.

(21) Appl. No.: 13/588,787

(22) Filed: Aug. 17, 2012

(65) Prior Publication Data

US 2013/0049597 A1 Feb. 28, 2013

(30) Foreign Application Priority Data

Aug. 25, 2011 (TW) .............................. 100130460 A

(51) Int. Cl.
*H05B 37/02* (2006.01)

(52) U.S. Cl.
USPC .......................................... 315/113; 315/219

(58) Field of Classification Search
None
See application file for complete search history.

(56) References Cited

U.S. PATENT DOCUMENTS

| | | | | | |
|---|---|---|---|---|---|
| 4,438,384 | A | * | 3/1984 | Akita et al. | 322/99 |
| 5,646,535 | A | * | 7/1997 | Dornier | 324/556 |
| 5,986,481 | A | * | 11/1999 | Kaminishi | 327/96 |
| 6,114,814 | A | * | 9/2000 | Shannon et al. | 315/219 |
| 6,316,881 | B1 | * | 11/2001 | Shannon et al. | 315/219 |
| 8,653,893 | B2 | * | 2/2014 | Tsuchi | 330/255 |
| 2011/0199366 | A1 | * | 8/2011 | Tsuchi | 345/212 |
| 2012/0098514 | A1 | * | 4/2012 | Wang et al. | 323/285 |

* cited by examiner

*Primary Examiner* — Crystal L Hammond

(74) *Attorney, Agent, or Firm* — Muncy, Geissler, Olds & Lowe, P.C.

(57) ABSTRACT

A method for dynamically controlling heat dissipation of an AC LED driving circuit has steps of connecting multiple voltage-controlled transistors and a current detection unit in series to a power loop having an LED unit, connecting a resistive element between each adjacent two of the voltage-controlled transistors to constitute multiple stages of power distribution units, detecting a voltage and a current of the power loop and calculating a consumed power value, and switching to one of the stages of power distribution units with a power range in which the current power value falls. As the higher stage of power distribution unit has more resistive elements for current to flow therethrough, it can share the power of the single-chip voltage-controlled transistor when the LED unit having higher power is used, thereby avoiding overheated condition and malfunction of the voltage-controlled transistor.

45 Claims, 8 Drawing Sheets

METHOD AND DEVICE FOR DYNAMICALLY CONTROLLING HEAT DISSIPATION OF AN ALTERNATING CURRENT LIGHT-EMITTING DIODE DRIVING CIRCUIT

BACKGROUND OF THE INVENTION

1. Field of the Invention

The present invention relates to an alternating current (AC) light-emitting diode (LED) driving circuit and more particularly to a method and a device for dynamically controlling heat dissipation of an AC LED driving circuit.

2. Description of the Related Art

With reference to FIG. 8, an AC LED driving circuit has a full-bridge rectifier 50, an LED unit 51, a voltage-controlled transistor 52, a current detection unit 53 and a steady current control unit 54. The full-bridge rectifier 50 is connected to an AC power source. The AC power is rectified to a half-wave DC power and then outputted to the LED unit 51. As the voltage-controlled transistor 52 and the current detection unit 53 are connected in series to a power loop constituted by the half-wave DC power and the LED unit 51. Hence, the steady current control unit 54 can detect the magnitude of current flowing through the LED unit 51 through the current detection unit, further determine if the value of the current flowing through the LED unit 51 now is too large or too small relative to a reference current value, and adjust a bias voltage of the voltage-controlled transistor 51 to maintain the value of the current flowing through the LED unit 51 at a fixed level for the LED unit 51 to stably emit light.

As the foregoing AC LED driving circuit is a non-isolated driving circuit and has no capacitor or inductor therein, the AC LED driving circuit has an rather high overall power factor and conversion efficiency being effective in saving power. However, to keep a stable current flowing through the LED unit 51, the single-chip voltage-controlled transistor 52 used in the AC LED driving circuit to control electronic components of the LED unit 51 fails to be normally operated for the sake of being easily overheated when the LED unit with high wattage is applied.

SUMMARY OF THE INVENTION

An objective of the present invention is to provide a method and a device for dynamically controlling heat dissipation of an AC LED driving circuit to improve the drawback that a single-chip voltage-controlled transistor fails to normally function when it is used in an AC LED driving circuit having a high-power LED unit and generating high heat.

To achieve the foregoing objective, the method for dynamically controlling heat dissipation of an AC LED driving circuit has steps of:

connecting multiple voltage-controlled transistors and a current detection unit in series to a power loop having an LED unit;

connecting a resistive element between each adjacent two of the voltage-controlled transistors to constitute multiple stages of power distribution units, wherein each stage of power distribution units corresponds to a power range of the LED unit;

detecting a voltage and a current of the power loop and calculating a current power value; and switching to one of the stages of power distribution units with a power range in which the current power value falls.

The method for dynamically controlling heat dissipation of an AC LED driving circuit first activates one of the stages of power distribution units having a low power range to constitute the power loop after the AC LED driving circuit is activated, then calculates the current power of the LED unit according to the detected voltage and current of the power loop, determines which one of the stages of power distribution units has the power range in which the current power of the LED unit falls, and switches off the currently activated power distribution unit and switches on the power distribution unit having the corresponding power range. As the higher stage of power distribution unit has more resistive elements in the power loop for current to flow therethrough, it can share the power of the single-chip voltage-controlled transistor when high-power LED unit is used, thereby avoiding overheated issue and malfunction of the voltage-controlled transistor.

To achieve the foregoing objective, the device for dynamically controlling heat dissipation of an AC LED driving circuit has a full-bridge rectifier, an LED unit, a primary voltage-controlled transistor, multiple power distribution units, a current detection unit, a voltage detection unit and a steady current control and power calculation unit.

The full-bridge rectifier is connected to an AC power source and converts the AC power into a half-wave DC power.

The LED unit has an anode and a cathode. The anode is connected to a positive output terminal of the full-bridge rectifier.

The primary voltage-controlled transistor has a first terminal connected to the cathode of the LED unit.

The power distribution units are parallelly connected between the first terminal and a second terminal of the primary voltage-controlled transistor. Each power distribution unit has a secondary voltage-controlled transistor and a resistive element connected in series with the secondary voltage-controlled transistor.

The current detection unit is connected to the second terminal of the primary voltage-controlled transistor and a negative output terminal of the full-bridge rectifier.

The voltage detection unit is connected multiple nodes. One of the nodes is between the primary voltage-controlled transistor and the LED unit, and each of the rest of nodes is connected between the secondary voltage-controlled transistor of one of the power distribution units and the resistive element of the power distribution unit.

The steady current control and power calculation unit is connected to the control terminal of the primary voltage-controlled transistor and the control terminal of each secondary voltage-controlled transistor and is connected to the current detection unit through a low-pass filter to detect a current flowing through the LED unit through the current detection unit. After a turn-on voltage of the primary voltage-controlled transistor or any one of the secondary voltage-controlled transistors is detected, a currently consumed power is calculated, the primary voltage-controlled transistor is continuously turned on or one of the power distribution units with a corresponding power range is switched on to constitute a power loop according to a value of the currently consumed power, and a voltage of the primary voltage-controlled transistor or each secondary voltage-controlled transistor is controlled at the same time according to the currently detected current, so as to maintain the current flowing through the LED unit of the power loop to be a constant.

When the AC power is inputted, the steady current control and power calculation unit first controls the primary voltage-controlled transistor to turn on so as to constitute a power loop, detects a current and a voltage of the power loop, and calculates an overall power and a current power of the LED unit and takes a difference of both as a current consumed power. According to the value of the consumed power, one of the secondary voltage-controlled transistors having a power range in which the consumed power falls is activated. As the secondary voltage-controlled transistor in the higher order of power distribution unit has more resistive elements in the power loop for current to flow therethrough, the resistive elements can share the power of the single-chip voltage-controlled transistor when the LED unit having higher power is used, thereby avoiding overheated condition and malfunction of the voltage-controlled transistor.

Other objectives, advantages and novel features of the invention will become more apparent from the following detailed description when taken in conjunction with the accompanying drawings.

DETAILED DESCRIPTION OF THE INVENTION

Figure 1:
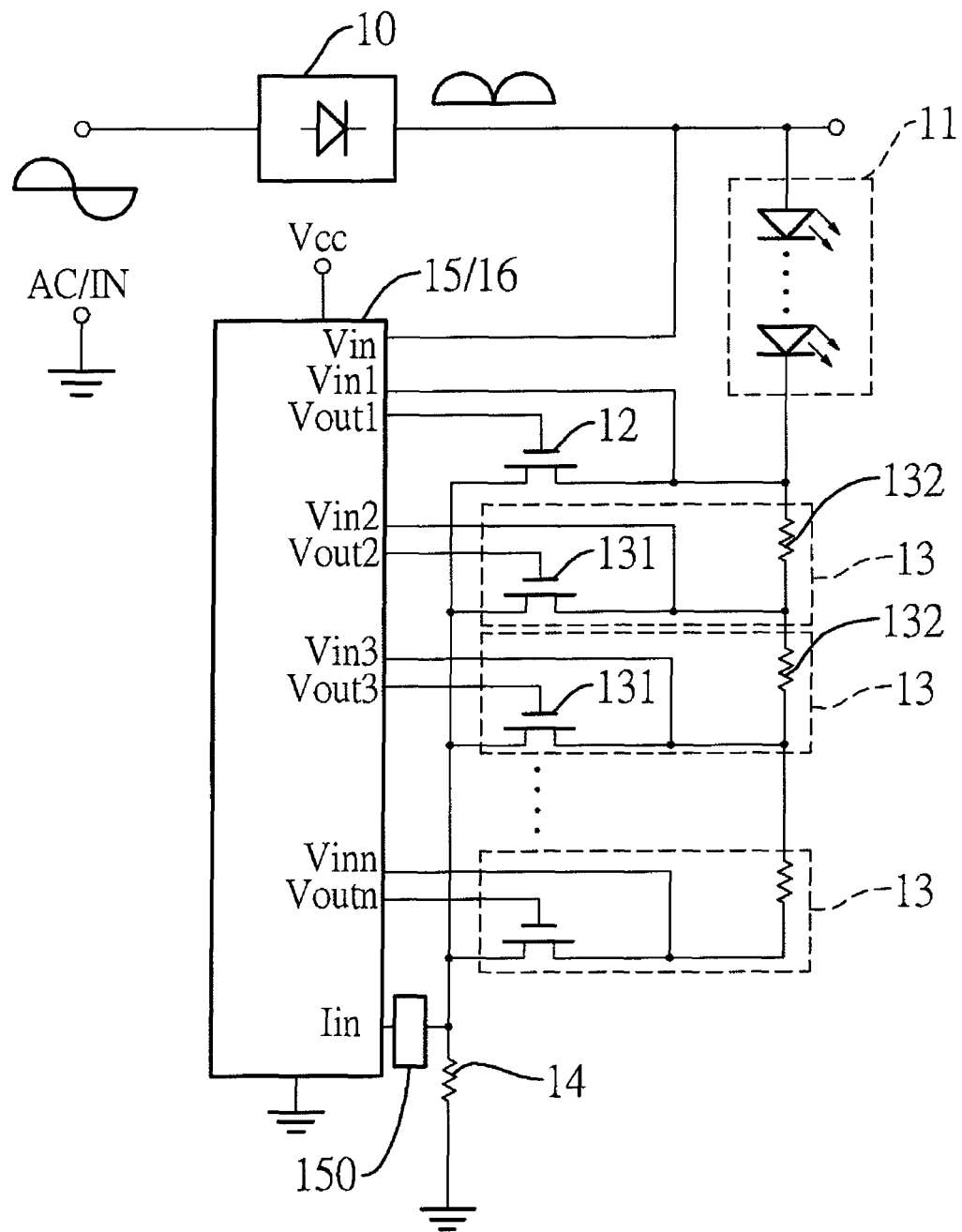
FIG. 1 is a circuit diagram of a first embodiment of a device for dynamically controlling heat dissipation of an AC LED driving circuit in accordance with the present invention.

With reference to FIG. 1, a first embodiment of a device for dynamically controlling heat dissipation of an AC LED driving circuit in accordance with the present invention has a full-bridge rectifier 10, an LED unit 11, a primary voltage-controlled transistor 12, multiple power distribution units 13, a current detection unit 14, a voltage detection unit 16 and a steady current control and power calculation unit 15.

The full-bridge rectifier 10 is connected to an AC power source and converts the AC power into a half-wave DC power.

An anode of the LED unit 11 is connected to a positive output terminal of the full-bridge rectifier 10. The LED unit 11 has multiple LED elements connected to each other in series, in parallel or a combination of both.

A first terminal of the primary voltage-controlled transistor 12 is connected to a cathode of the LED unit 11. The primary voltage-controlled transistor 12 may be a MOSFET (Metal Oxide Semiconductor Field Effect Transistor), an IGBT (Insulated Gate Bipolar Transistor) or the like. In the present embodiment, the primary voltage-controlled transistor 12 is a MOSFET having a source, a drain and a gate (control terminal). The first terminal connected to the cathode of the LED unit 11 is the source of the MOSFET.

The power distribution units 13 correspond to different power ranges and are parallelly connected between the first terminal and a second terminal of the primary voltage-controlled transistor 12, i.e. the source and the drain of the MOS-FET. Each power distribution unit 13 has a secondary voltage-controlled transistor 131 and a resistive element 132 connected in series with the secondary voltage-controlled transistor 131. In the present embodiment, the secondary voltage-controlled transistor 131 may be a MOSFET or an IGBT, and has source, a drain and a gate (control terminal) if the MOSFET is applied. The drain of the secondary voltage-controlled transistor 131 of each power distribution unit 13 is connected to one end of a corresponding resistive element 132. The source of the secondary voltage-controlled transistor 131 of the power distribution unit 13 and the other end of the corresponding resistive element 132 are respectively connected to the source and the drain of the primary voltage-controlled transistor 12. The resistive element 132 may be a resistor, an LED element or the like.

The current detection unit 14 is connected to the second terminal of the primary voltage-controlled transistor 12 and a negative output terminal of the full-bridge rectifier 10 to detect a current flowing through a power loop constituted by the primary voltage-controlled transistor 12 or any one of the power distribution units 13 and the LED unit 13. In the present embodiment, the current detection unit 14 is a resistor with a fixed resistance value.

The voltage detection unit 16 is connected to the positive output terminal of the full-bridge rectifier 10, and is connected to multiple nodes. One of the nodes is connected between the primary voltage-controlled transistor 12 and the LED unit 11, and each of the rest of nodes is connected between the secondary voltage-controlled transistor 131 of each power distribution unit 13 and the resistive element 132 of the power distribution unit 13, so as to acquire a corresponding voltage V1~Vn while the primary voltage-controlled transistor 12 or any one of the secondary voltage-controlled transistors 131 are turned on.

The steady current control and power calculation unit 15 is connected to the control terminal of the primary voltage-controlled transistor 12 and the control terminal of each secondary voltage-controlled transistor 131 and is connected to the current detection unit 14 through a low-pass filter 150 to detect current flowing through the LED unit 11 through the current detection unit 14. After a turn-on voltage of the primary voltage-controlled transistor 12 or any one of the secondary voltage-controlled transistors 131 is detected, a currently consumed power can be calculated. According to a value of the currently calculated power, the primary voltage-controlled transistor 12 is continuously turned on or one of the power distribution units with a corresponding power range is switched on. Meanwhile, according to the currently detected current, the voltage of the primary voltage-controlled transistor 12 or each secondary voltage-controlled transistor is controlled so as to maintain the current flowing through the LED unit 11 of the power loop to be a constant. In the present embodiment, the voltage detection unit 16 is integrated in the steady current control and power calculation unit 15.

In the following, circuit operation of the device for dynamically controlling heat dissipation of the AC LED driving circuit is described. When the AC power source is on, the steady current control and power calculation unit 15 first controls the primary voltage-controlled transistor 12 to turn on to constitute the power loop of the LED unit 11. The steady current control and power calculation unit 15 further detects the turn-on voltage of the primary voltage-controlled transistor 12 with respect to ground through the voltage detection unit 16. After the current detection unit 14 detects the current of the power loop of the LED unit 11, the currently consumed power $P_C$ can be directly calculated. The currently consumed power is used to determine if it falls in the power range of any one of the power distribution units 13. In the present embodiment, there are N stages of power distribution units 13. The first stage of power distribution unit 13 has a power range between $P_{11}$ and $P_{12}$, and the second stage of power distribution unit 13 has a power range between $P_{21}$ and $P_{22}$. Therefore, the $N^{th}$ stage of power distribution unit 13 has a power range between $P_{N1}$ and $P_{N2}$.

Figure 2A:
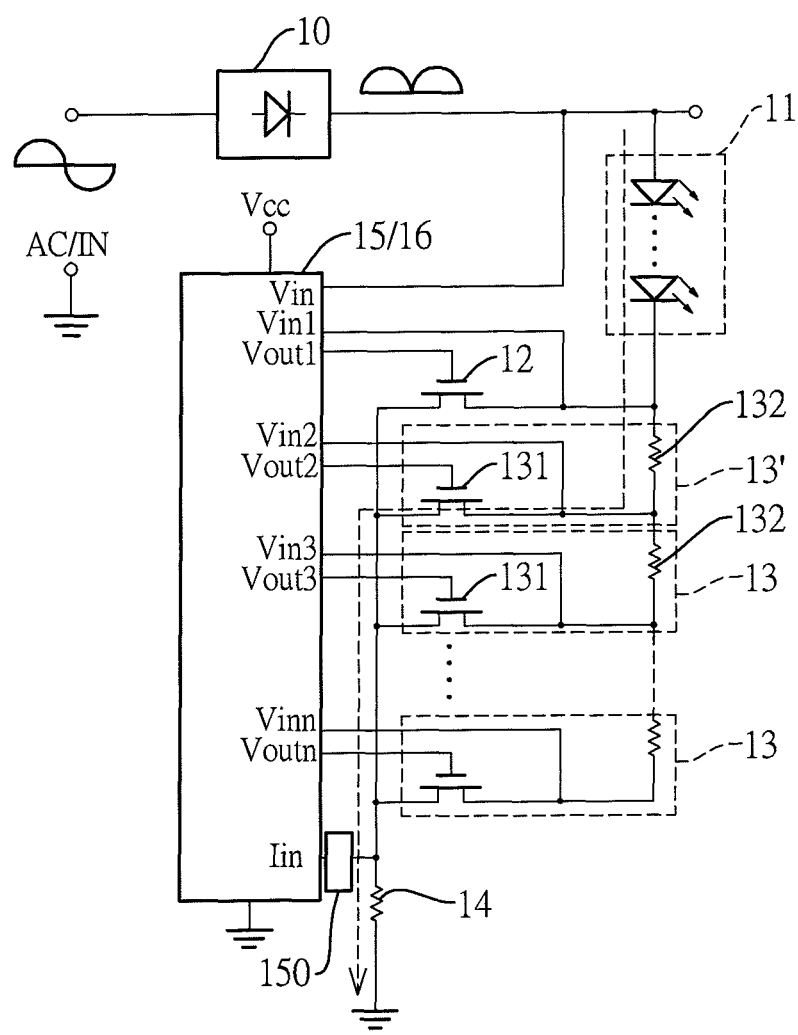
FIG. 2A is an equivalent circuit diagram showing a circuit operation of the device in FIG. 1.

With reference to FIG. 2A, if the currently consumed power $P_C$ falls in the power range of the first stage of power distribution unit 13' ($P_{11}<P_C<P_{12}$), the primary voltage-controlled transistor 12 is turned off and the secondary voltage-controlled transistor 131 of the first stage of power distribution unit 13' is turned on. As a power loop constituted by the LED unit 11 and the first stage of power distribution unit 13' has the resistive element 132 of the first stage of power distribution unit 13' serially connected with the power loop, the consumed power of the power loop is partially absorbed by the resistive element 132 to prevent the corresponding secondary voltage-controlled transistor from being overheated.

Figure 2B:
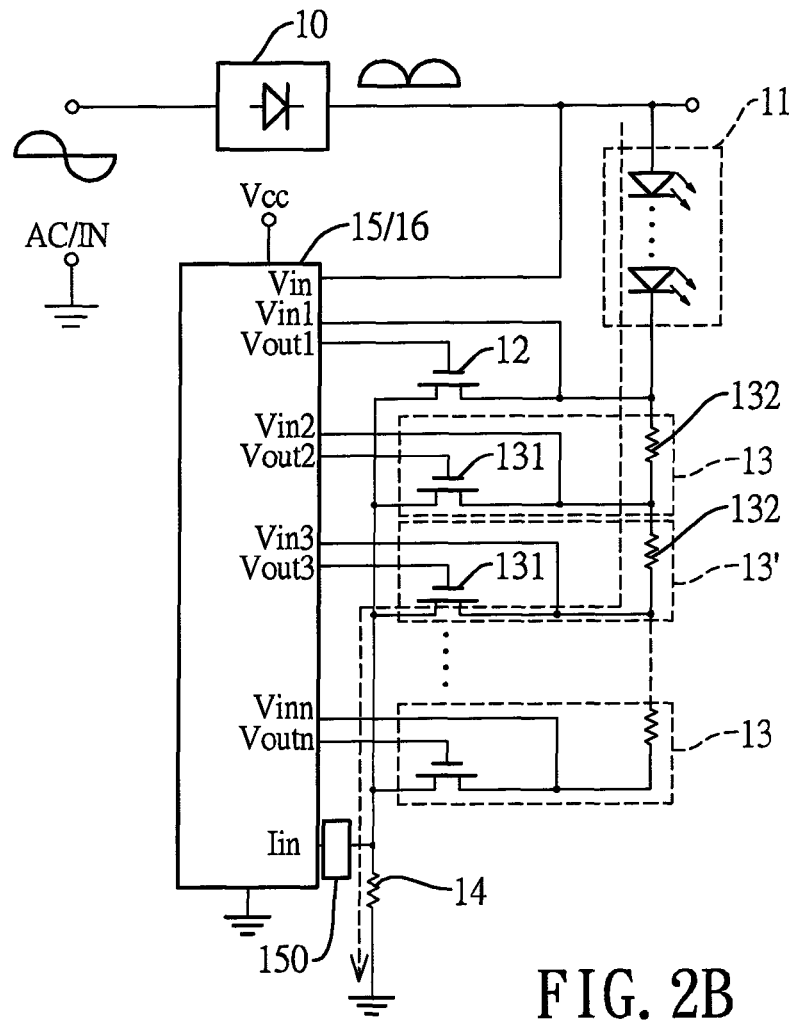
FIG. 2B is an equivalent circuit diagram showing another circuit operation of the device in FIG. 1.

With reference to FIG. 2B, if the currently consumed power $P_C$ falls in the power range of the second stage of power distribution unit 13' ($P_{21}<P_C<P_{22}$), the primary voltage-controlled transistor 12 is turned off and the secondary voltage-controlled transistor 131 of the second stage of power distribution unit 13' is turned on. As a power loop constituted by the LED unit 11 and the first stage of power distribution unit 13' has the resistive elements 132 of the first and second stages of power distribution units serially connected with the power loop, the consumed power of the power loop is partially absorbed by the two resistive elements 132 to prevent the corresponding secondary voltage-controlled transistors from being overheated.

Figure 3:
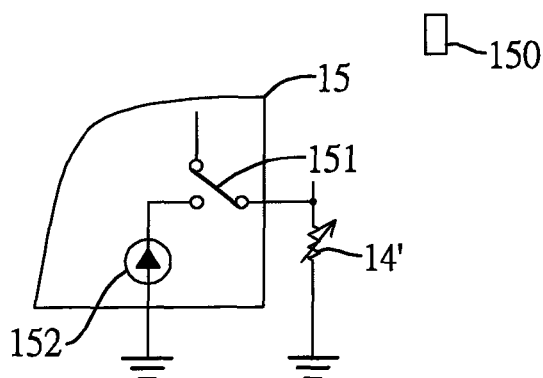
FIG. 3 is a circuit diagram of another steady current control unit of the device in FIG. 1.

With reference to FIG. 3, the current detection unit 14' of the foregoing AC LED driving circuit may be a variable resistor. As a result, the current flowing through the LED unit 11 fails to be detected through the current detection unit 14'. The steady current control and power calculation unit 15 is further connected to the current detection unit 14 through a switch 151 connected to a constant current source 152. To detect the current flowing through the LED unit for the time being, the switch is switched so that the current detection unit 14' is connected to the constant current source 152. Given the constant current source 151 and the voltage drop across the current detection unit 14', the resistance value of the current detection unit 14' can be obtained and the current flowing through the LED unit 11 can be detected.

Figure 4:
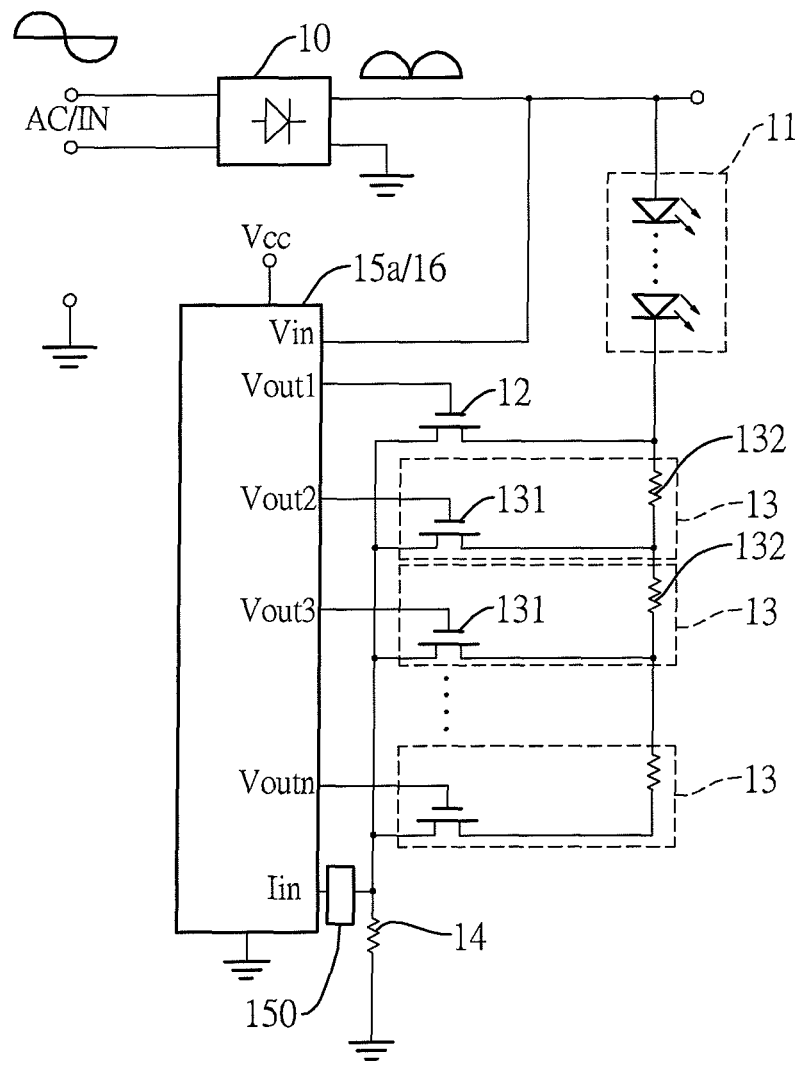
FIG. 4 is a circuit diagram of a second embodiment of a device for dynamically controlling heat dissipation of an AC LED driving circuit in accordance with the present invention.
Figure 5:
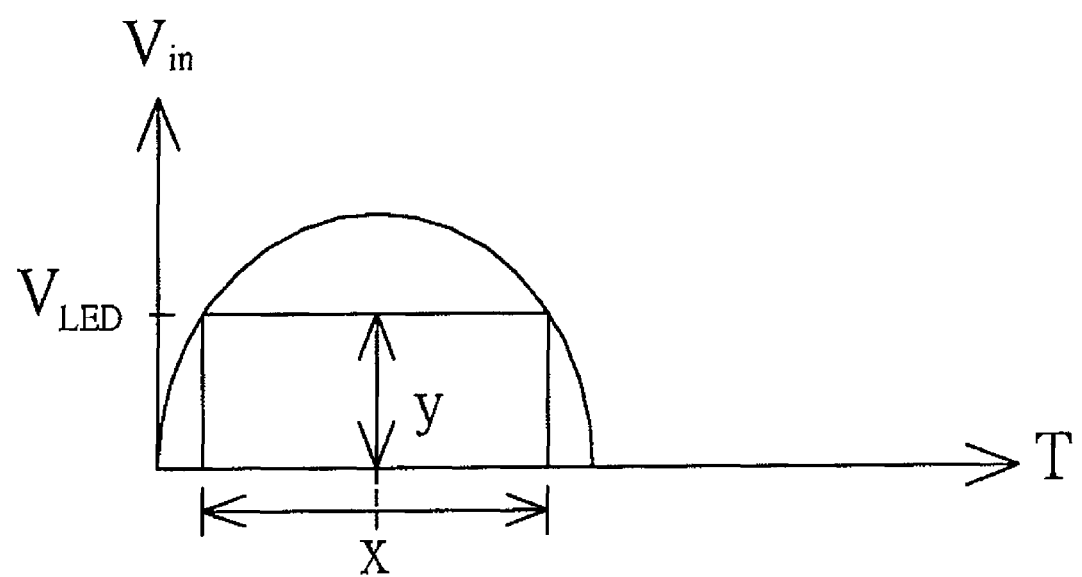
FIG. 5 is a waveform diagram showing a half-wave DC power and a pulse current signal generated in the device in FIG. 1 and FIG. 4.
Figure 6:
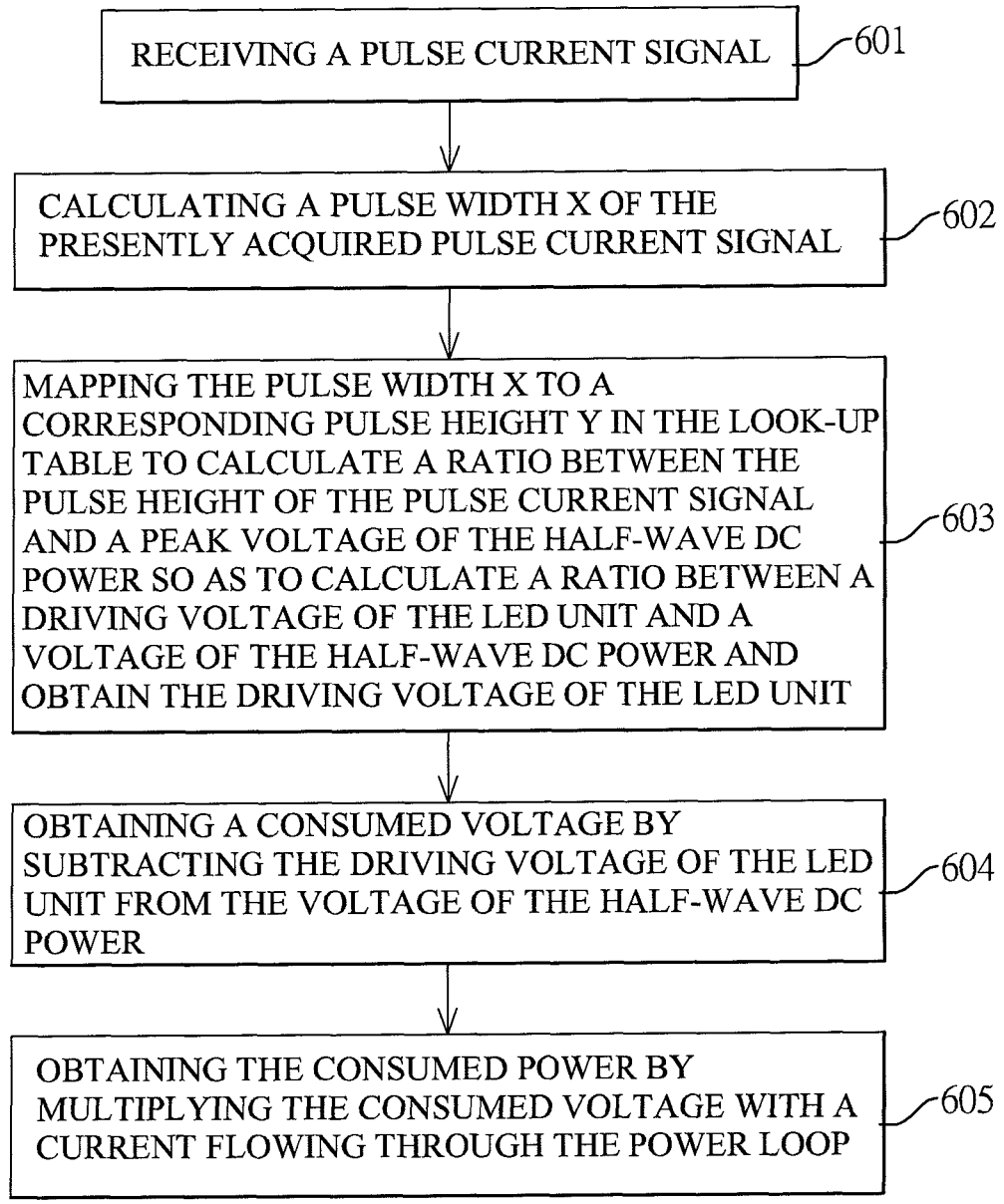
FIG. 6 is a flow diagram of a consumed power calculation procedure in accordance with the present invention.

With reference to FIG. 4, a second embodiment of a device for dynamically controlling heat dissipation of an AC LED driving circuit in accordance with the present invention is shown and is mostly the same as the foregoing embodiment as shown in FIG. 1. The steady current control and power calculation unit 15a is directly connected to the positive output terminal of the full-bridge rectifier 10 to acquire a voltage $V_{in}$ from the half-wave DC power, and has a look-up table and a consumed power calculation procedure embedded therein. The look-up table serves to establish a mapping relationship between a pulse width x and a pulse height y generated using pulse width modulation. The consumed power calculation procedure serves to calculate the consumed power $P_C$. With reference to FIG. 5 and FIG. 6, the consumed power calculation procedure is executed by the steady current control and power calculation unit 15 and has the following steps.

Step 601: Receive a pulse current signal. As the steady current control and power calculation unit 15 is connected to the current detection unit 14, a pulse current signal can be acquired (the pulse current signal is generated after the half-wave DC power passes through the LED unit).

Step 602: Calculate a pulse width x of the presently acquired pulse current signal.

Step 603: Map the pulse width x to a corresponding pulse height y in the look-up table to calculate a ratio between the pulse height of the pulse current signal and a peak voltage of the half-wave DC power so as to calculate a ratio between a driving voltage of the LED unit $V_{LED}$ and a voltage of the half-wave DC power $V_{in}$ and obtain the driving voltage of the LED unit $V_{LED}$.

Step 604: Obtain a consumed voltage $V_C$ by subtracting the driving voltage of the LED unit $V_{LED}$ from the voltage of the half-wave DC power $V_{in}$ ($V_C=V_{in}-V_{LED}$).

Step 605: Obtain the consumed power $P_C$ by multiplying the consumed voltage $V_C$ with a current $I_{LED}$ flowing through the power loop.

Hence, no voltage detection unit is required in the present embodiment. The steady current control and power calculation unit 15a alone is enough to calculate the current consumed power.

Figure 7:
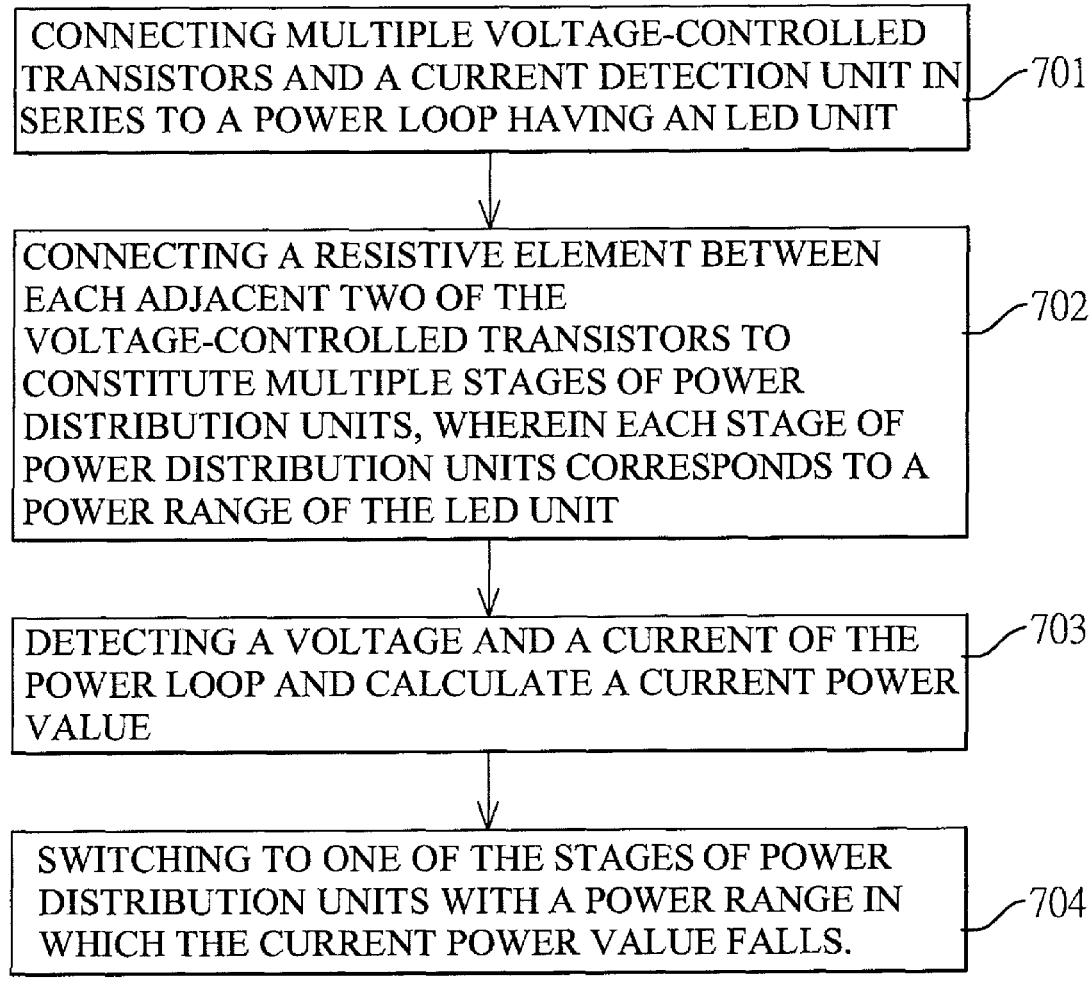
FIG. 7 is a method for dynamically controlling heat dissipation of an AC LED driving circuit in accordance with the present invention.
Figure 8:
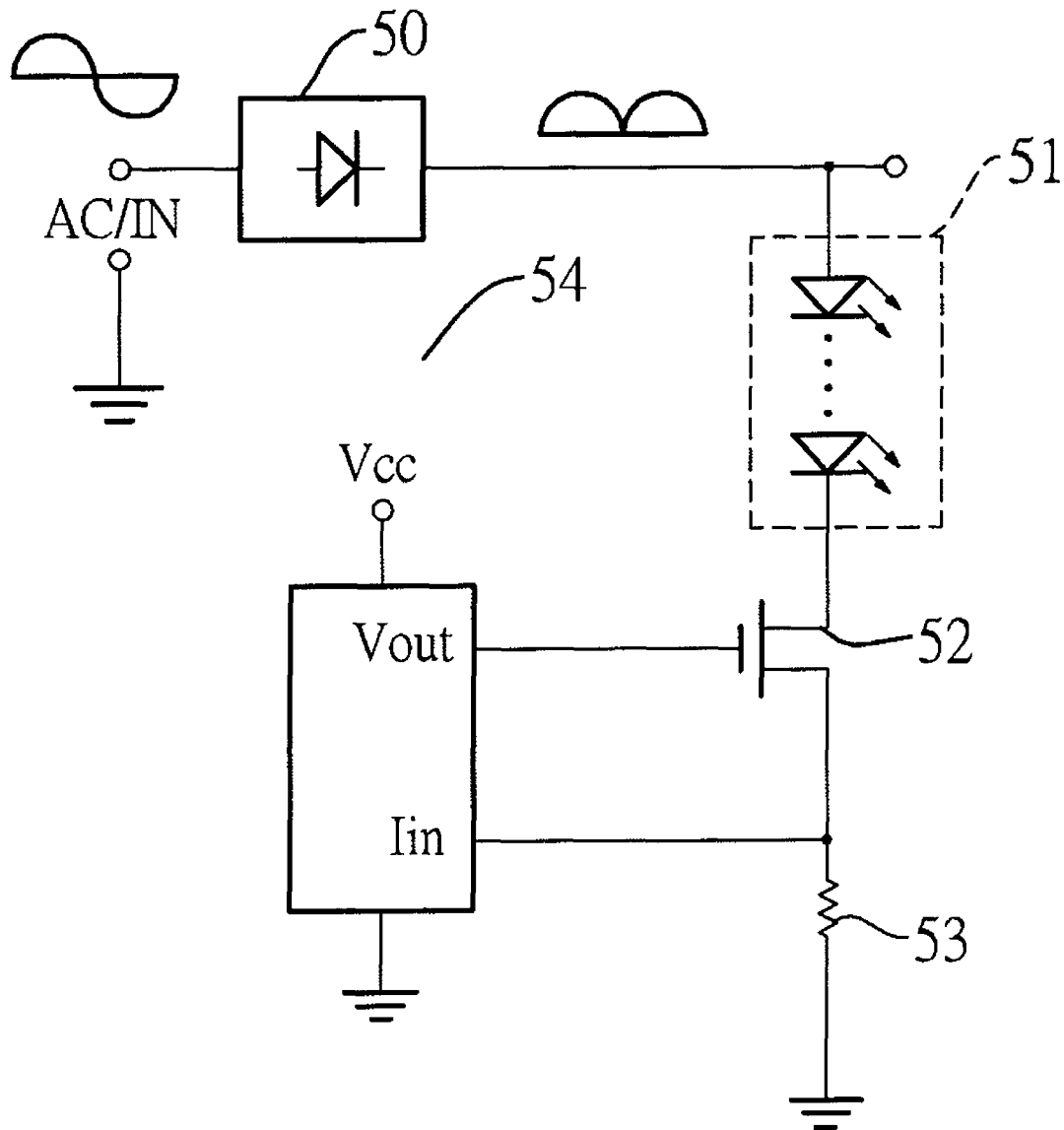
FIG. 8 is a conventional AC LED driving circuit.

With reference to FIG. 7, a method for dynamically controlling heat dissipation of an AC LED driving circuit in accordance with the present invention has the following steps.

Step 701: Connect multiple voltage-controlled transistors 12, 131 and a current detection unit 14 in series to a power loop having an LED unit 11.

Step 702: Connect a resistive element 132 between each adjacent two of the voltage-controlled transistors 12, 131 to constitute multiple stages of power distribution units 13, wherein each stage of power distribution units 13 corresponds to a power range of the LED unit 11.

Step 703: Detect a voltage and a current of the power loop and calculate a current power value.

Step 704: Switch to one of the stages of power distribution units 13 with a power range in which the current power value falls.

The method for dynamically controlling heat dissipation of an AC LED driving circuit first activates one of the stages of power distribution units having a low power range to constitute the power loop after the AC LED driving circuit is activated, then calculates the current power of the LED unit according to the detected voltage and current of the power loop, determines which one of the stages of power distribution units has the power range in which the current power of the LED unit falls, and switches off the currently activated power distribution unit and switches on the power distribution unit having the corresponding power range. As the higher stage of power distribution unit has more resistive elements in the power loop for current to flow therethrough, it can share the power of the single-chip voltage-controlled transistor for constant current control when the LED unit having higher power is used, thereby avoiding overheated condition and malfunction of the voltage-controlled transistor.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method for dynamically controlling heat dissipation of an AC LED driving circuit, comprising steps of:
connecting multiple voltage-controlled transistors and a current detection unit in series to a power loop having an LED unit;

connecting a resistive element between each adjacent two of the voltage-controlled transistors to constitute multiple stages of power distribution units, wherein each stage of power distribution units corresponds to a power range of the LED unit;

detecting a voltage and a current of the power loop and calculating a current power value; and switching to one of the stages of power distribution units with a power range in which the current power value falls.

2. A device for dynamically controlling heat dissipation of an AC LED driving circuit, comprising:

a full-bridge rectifier connected to an AC power source and converting the AC power into a half-wave DC power;

an LED unit having:
an anode connected to a positive output terminal of the full-bridge rectifier; and
a cathode;

a primary voltage-controlled transistor having a first terminal connected to the cathode of the LED unit;

multiple power distribution units parallelly connected between the first terminal and a second terminal of the primary voltage-controlled transistor, each power distribution unit having a secondary voltage-controlled transistor and a resistive element connected in series with the secondary voltage-controlled transistor;

a current detection unit connected to the second terminal of the primary voltage-controlled transistor and a negative output terminal of the full-bridge rectifier;

a voltage detection unit connected to multiple nodes, wherein one of the nodes is connected between the primary voltage-controlled transistor and the LED unit, and each of the rest of nodes is connected between one of the secondary voltage-controlled transistors of a corresponding power distribution unit and the resistive element of the power distribution unit; and a steady current control and power calculation unit connected to the control terminal of the primary voltage-controlled transistor and the control terminal of each secondary voltage-controlled transistor and connected to the current detection unit through a low-pass filter to detect a current flowing through the LED unit through the current detection unit, wherein after a turn-on voltage of the primary voltage-controlled transistor or any one of the secondary voltage-controlled transistors is detected, a currently consumed power is calculated, the primary voltage-controlled transistor is continuously turned on or one of the power distribution units with a corresponding power range is switched on to constitute a power loop according to a value of the currently consumed power, and a voltage of the primary voltage-controlled transistor or each secondary voltage-controlled transistor is controlled at the same time according to the currently detected current, so as to maintain the current flowing through the LED unit of the power loop to be a constant.

3. The device as claimed in claim 2, wherein
the resistive element is a resistor or an LED element; and
the current detection unit is a resistor with a fixed resistance value.

4. The device as claimed in claim 3, wherein the primary voltage-controlled transistor and each secondary voltage-controlled transistor are MOSFET (Metal Oxide Semiconductor Field Effect Transistor).

5. The device as claimed in claim 4, wherein
the drain of the secondary voltage-controlled transistor of each power distribution unit is connected to one end of a corresponding resistive element; and
the source of the secondary voltage-controlled transistor of the power distribution unit and the other end of the corresponding resistive element are respectively connected to the source and the drain of the primary voltage-controlled transistor.

6. The device as claimed in claim 5, wherein the LED unit has multiple LED elements connected to each other in series, in parallel or a combination of both.

7. The device as claimed in claim 3, wherein the LED unit has multiple LED elements connected to each other in series, in parallel or a combination of both.

8. The device as claimed in claim 4, wherein the LED unit has multiple LED elements connected to each other in series, in parallel or a combination of both.

9. The device as claimed in claim 2, wherein
the resistive element is a resistor or an LED element; and
the current detection unit is a variable resistor; and
the steady current control and power calculation unit is further connected to the current detection unit through a switch connected to a constant current source.

10. The device as claimed in claim 9, wherein the primary voltage-controlled transistor and each secondary voltage-controlled transistor are MOSFET (Metal Oxide Semiconductor Field Effect Transistor).

11. The device as claimed in claim 10, wherein
the drain of the secondary voltage-controlled transistor of each power distribution unit is connected to one end of a corresponding resistive element; and
the source of the secondary voltage-controlled transistor of the power distribution unit and the other end of the corresponding resistive element are respectively connected to the source and the drain of the primary voltage-controlled transistor.

12. The device as claimed in claim 11, wherein the LED unit has multiple LED elements connected to each other in series, in parallel or a combination of both.

13. The device as claimed in claim 9, wherein the LED unit has multiple LED elements connected to each other in series, in parallel or a combination of both.

14. The device as claimed in claim 10, wherein the LED unit has multiple LED elements connected to each other in series, in parallel or a combination of both.

15. The device as claimed in claim 2, wherein the primary voltage-controlled transistor and each secondary voltage-controlled transistor are MOSFET (Metal Oxide Semiconductor Field Effect Transistor).

16. The device as claimed in claim 15, wherein
the drain of the secondary voltage-controlled transistor of each power distribution unit is connected to one end of a corresponding resistive element; and
the source of the secondary voltage-controlled transistor of the power distribution unit and the other end of the corresponding resistive element are respectively connected to the source and the drain of the primary voltage-controlled transistor.

17. The device as claimed in claim 16, wherein the LED unit has multiple LED elements connected to each other in series, in parallel or a combination of both.

18. The device as claimed in claim 15, wherein the LED unit has multiple LED elements connected to each other in series, in parallel or a combination of both.

19. The device as claimed in claim 2, wherein the LED unit has multiple LED elements connected to each other in series, in parallel or a combination of both.

20. A device for dynamically controlling heat dissipation of an AC LED driving circuit, comprising:
   a full-bridge rectifier connected to an AC power source and converting the AC power into a half-wave DC power;
   an LED unit having:
      an anode connected to a positive output terminal of the full-bridge rectifier; and
      a cathode;
   a primary voltage-controlled transistor having a first terminal connected to the cathode of the LED unit;
   multiple power distribution units parallelly connected between the first terminal and a second terminal of the primary voltage-controlled transistor, each power distribution unit having a secondary voltage-controlled transistor and a resistive element connected in series with the secondary voltage-controlled transistor;
   a current detection unit connected to the second terminal of the primary voltage-controlled transistor and a negative output terminal of the full-bridge rectifier; and
   a steady current control and power calculation unit connected to a positive output terminal of the full-bridge rectifier, connected to the control terminal of the primary voltage-controlled transistor and the control terminal of each secondary voltage-controlled transistor, connected to the current detection unit through a low-pass filter to detect a current flowing through the LED unit through the current detection unit, and having:
      a look-up table serving to establish a mapping relationship between a pulse width and a pulse height generated using pulse width modulation; and
      a consumed power calculation procedure embedded therein and serving to calculate the consumed power of the LED unit;
   wherein the primary voltage-controlled transistor or one of the power distribution units with a power range in which the consumed power falls is switched on to constitute a power loop, and a voltage of the primary voltage-controlled transistor or each secondary voltage-controlled transistor is controlled according to the currently detected current, so as to maintain the current flowing through the LED unit of the power loop to be a constant.

21. The device as claimed in claim 20, wherein the consumed power calculation procedure is executed by the steady current control and power calculation unit and has steps of:
   receiving a pulse current signal, wherein the pulse current signal is generated after the half-wave DC power passes through the LED unit;
   calculating a pulse width of the presently acquired pulse current signal;
   mapping the pulse width to a corresponding pulse height in the look-up table to calculate a ratio between the pulse height of the pulse current signal and a peak voltage of the half-wave DC power so as to calculate a ratio between a driving voltage of the LED unit and a voltage of the half-wave DC power and obtain the driving voltage of the LED unit;
   obtaining a consumed voltage by subtracting the driving voltage of the LED unit from the voltage of the half-wave DC power; and
   obtaining the consumed power by multiplying the consumed voltage with a current flowing through the power loop.

22. The device as claimed in claim 21, wherein
   the resistive element is a resistor or an LED element; and
   the current detection unit is a resistor with a fixed resistance value.

23. The device as claimed in claim 22, wherein the primary voltage-controlled transistor and each secondary voltage-controlled transistor are MOSFET.

24. The device as claimed in claim 23, wherein
   the drain of the secondary voltage-controlled transistor of each power distribution unit is connected to one end of a corresponding resistive element; and
   the source of the secondary voltage-controlled transistor of the power distribution unit and the other end of the corresponding resistive element are respectively connected to the source and the drain of the primary voltage-controlled transistor.

25. The device as claimed in claim 24, wherein the LED unit has multiple LED elements connected to each other in series, in parallel or a combination of both.

26. The device as claimed in claim 22, wherein the LED unit has multiple LED elements connected to each other in series, in parallel or a combination of both.

27. The device as claimed in claim 26, wherein the LED unit has multiple LED elements connected to each other in series, in parallel or a combination of both.

28. The device as claimed in claim 21, wherein
   the resistive element is a resistor or an LED element; and
   the current detection unit is a variable resistor; and
   the steady current control and power calculation unit is further connected to the current detection unit through a switch connected to a constant current source.

29. The device as claimed in claim 28, wherein the primary voltage-controlled transistor and each secondary voltage-controlled transistor are MOSFET.

30. The device as claimed in claim 29, wherein
   the drain of the secondary voltage-controlled transistor of each power distribution unit is connected to one end of a corresponding resistive element; and
   the source of the secondary voltage-controlled transistor of the power distribution unit and the other end of the corresponding resistive element are respectively connected to the source and the drain of the primary voltage-controlled transistor.

31. The device as claimed in claim 30, wherein the LED unit has multiple LED elements connected to each other in series, in parallel or a combination of both.

32. The device as claimed in claim 28, wherein the LED unit has multiple LED elements connected to each other in series, in parallel or a combination of both.

33. The device as claimed in claim 32, wherein the LED unit has multiple LED elements connected to each other in series, in parallel or a combination of both.

34. The device as claimed in claim 21, wherein the primary voltage-controlled transistor and each secondary voltage-controlled transistor are MOSFET.

35. The device as claimed in claim 34, wherein
   the drain of the secondary voltage-controlled transistor of each power distribution unit is connected to one end of a corresponding resistive element; and
   the source of the secondary voltage-controlled transistor of the power distribution unit and the other end of the corresponding resistive element are respectively connected to the source and the drain of the primary voltage-controlled transistor.

36. The device as claimed in claim 35, wherein the LED unit has multiple LED elements connected to each other in series, in parallel or a combination of both.

37. The device as claimed in claim 21, wherein the LED unit has multiple LED elements connected to each other in series, in parallel or a combination of both.

38. The device as claimed in claim 37, wherein the LED unit has multiple LED elements connected to each other in series, in parallel or a combination of both.

39. The device as claimed in claim 20, wherein the primary voltage-controlled transistor and each secondary voltage-controlled transistor are MOSFET.

40. The device as claimed in claim 39, wherein
   the drain of the secondary voltage-controlled transistor of each power distribution unit is connected to one end of a corresponding resistive element; and
   the source of the secondary voltage-controlled transistor of the power distribution unit and the other end of the corresponding resistive element are respectively connected to the source and the drain of the primary voltage-controlled transistor.

41. The device as claimed in claim 40, wherein the LED unit has multiple LED elements connected to each other in series, in parallel or a combination of both.

42. The device as claimed in claim 39, wherein the LED unit has multiple LED elements connected to each other in series, in parallel or a combination of both.

43. The device as claimed in claim 42, wherein the LED unit has multiple LED elements connected to each other in series, in parallel or a combination of both.

44. The device as claimed in claim 20, wherein the LED unit has multiple LED elements connected to each other in series, in parallel or a combination of both.

45. The device as claimed in claim 44, wherein the LED unit has multiple LED elements connected to each other in series, in parallel or a combination of both.

* * * * *